Patented Nov. 17, 1931

1,832,381

UNITED STATES PATENT OFFICE

MAX HAGEDORN, OF DESSAU, AND OTTO REICHERT, OF DESSAU-ZIEBIGK, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF PREPARING CELLULOSE ESTERS OF LOWER FATTY ACIDS

No Drawing. Application filed May 31, 1928, Serial No. 282,042, and in Germany May 30, 1927.

It is known that cellulose esters can be made by the action of fatty acid chlorides on pretreated or not pretreated cellulose in an indifferent medium and in presence of an agent that binds acid, preferably an organic base. It has also been proposed to esterify cellulose by means of acetyl chloride in the presence of an organic base, a solvent for cellulose acetate being used as an indifferent medium. This process, however, has not displaced the esterification by means of acetic anhydride for it involves the production of the esterified material in a dissolved form and a consequent troublesome separation; moreover, the mechanical properties of the product are not good.

According to the present invention cellulose substances are esterified by a treatment with the addition product of a halide of a lower fatty acid and an organic base in the presence of an indifferent medium which dissolves in part or completely the said addition product but is no solvent for the cellulose compound to be treated and for the cellulose ester to be formed. Technically valuable products thus are obtained.

Any liquid having the above explained solubility relationship may be used, but halogenated aromatic hydrocarbons are particularly suitable. The indifferent medium is preferably used in such a proportion that thorough stirring of the mixture is possible with the minimum practicable consumption of power.

The addition product of a halide of a lower fatty acid and an organic base preferably is prepared by reacting in the presence of an indifferent liquid on an organic base, such as a tertiary amine, for instance a base of the pyridine series, with a chloride or bromide of a lower fatty acid, such as acetic acid, propionic acid, butyric acid, crotonic acid. The mixture thus obtained may be immediately employed in the esterification process.

It is advantageous that the cellulose to be esterified should be introduced into the mixture at a temperature which is only slightly below that at which the addition product of the acid halide and base is split up. These temperature ranges generally are from about 100° C. to about 120° C. When using, for example, acetyl chloride and pyridine the cellulose to be esterified may be introduced into the mixture containing the addition product from acetyl chloride and pyridine at a temperature lying not considerably lower than 100° C., for instance at about 90° C., the reaction mainly occurring in a short time at a temperature of about 110 to 115° C.

As cellulose substances there is to be understood any cellulose material, such as pure cellulose, cotton, a cellulose pretreated in any suitable manner, such as a cellulose partially esterified or etherified, the pretreatment, however, not having rendered it soluble in the indifferent medium to be used.

The process may be conducted with use of the addition products of several acid halides simultaneously or in a succession.

In this process the cellulose ester is not in solution at the end of the reaction but is suspended in the mixture in solid condition. This is an advantage, because the ester owing to its condition is not depolymerized and can easily be separated from the liquid constituents of the mixture. With diminution of cost and of expenditure of time cellulose esters which are highly valuable and suitable for the manufacture of films and artificial threads are obtained.

The following examples without limiting the invention may illustrate the process:

*Example 1.*—30 liters of chlorobenzene are mixed with 4.4 liters of pyridine and while thoroughly stirring 2.9 liters of acetylchloride are gradually added. This mixture is heated and when the temperature is 90° C. 1000 grams of cotton are introduced. Taking advantage of the heat of the reaction care is taken that the temperature of the mixture rises rapidly to about 110 to 115° C. The formation of cellulose ester is finished in about 45 minutes. The liquid is decanted from the cellulose acetate and the latter is purified by extracting it with boiling ethanol and then with hot water in the usual manner.

*Example 2.*—350 grams of wood cellulose are introduced at 70 to 90° C. into the reaction mass of 5.7 liters of chloronaphthalene, 1.6 liters of technical pyridine bases and 0.76 liters of acetylchloride. The esterification occurs at about 110 to 115° C. in the course of about 1 hour. The cellulose acetate is worked up according to example 1.

The esterification may also be executed at 100° C., but the result is then a bad soluble product, which must be heated for a short time at 110 to 115° C. in order to make it well soluble in chloromethane, tetrachloroethane, a mixture of chloromethane and methanol.

*Example 3.*—In the Example 1 for cotton is substituted a cellulose formate prepared in a known manner and containing 6 per cent. of chemically bound formic acid.

*Example 4.*—12 liters of chlorobenzene are mixed with 2.1 liters of technical pyridine bases and then while stirring a mixture of 720 grams of acetylchloride and 430 grams of propionylchloride is added. The mixture is heated and when 90° C. are reached 500 grams of cellulose are introduced. Taking advantage of the heat of the reaction care is taken that the temperature of the mixture rises rapidly to about 110 to 115° C. The cellulose acetate propionate thus formed may be isolated by decanting of the liquid. The product is soluble in acetone.

*Example 5.*—To a mixture of 5.4 liters of xylene and 1.3 liters of technical pyridine bases while stirring a mixture of 383 grams of acetylchloride and 518 grams of crotonylchloride slowly is added. The mixture is heated and when the temperature of 90° C. is reached 216 grams of cotton are introduced. The temperature is allowed to rapidly rise to about 110 to 115° C. The cellulose acetate crotonate is separated in the manner indicated in Example 1. It may be moulded into transparent articles by pressure in the warmth.

In the foregoing examples pyridine or technical pyridine bases are used as a tertiary amine. We prefer these bases of the pyridine series since they are cheap and show an excellent activity for the purpose set forth. They may be replaced, however, by other tertiary amines which are equivalents, and the following claims are intended to include such possibilities.

What we claim is:

1. The process of preparing cellulose esters of lower fatty acids which comprises treating cellulose simultaneously with a halide of a lower fatty acid and pyridine bases in the presence of an indifferent organic medium which dissolves, at least partly, the addition product formed in the reaction mixture between the acid halide and the tertiary amine, but which is no solvent for the cellulosic substance to be treated nor for the cellulose ester to be formed.

2. The process of preparing cellulose esters of lower fatty acids which comprises treating cellulose simultaneously with a halide of a lower fatty acid and pyridine bases in the presence of a halogenated aromatic hydrocarbon.

3. The process of preparing cellulose esters of lower fatty acids which comprises treating cellulose simultaneously with a halide of a lower fatty acid and pyridine bases in the presence of chlorobenzene.

4. The process of preparing cellulose esters of lower fatty acids which comprises introducing cellulose into the mixture of an indifferent organic medium with a halide of a lower fatty acid and pyridine bases at a temperature below 100° C. and then allowing the temperature to rise from about 100° C. up to about 120° C.

5. The process of preparing cellulose esters of lower fatty acids which comprises reacting in the presence of an indifferent medium on pyridine bases with a halide of a lower fatty acid, introducing cellulose at a temperature below 100° C. and then allowing the temperature to rise from about 100° C. up to about 120° C.

6. The process of preparing cellulose acetate propionate which comprises mixing chlorobenzene, pyridine bases, acetylchloride and propionylchloride, heating the mixture up to 80 to 100° C., introducing at this temperature cellulose and then raising the temperature to about 110 to 115° C.

7. A cellulose ester of lower fatty acids prepared by the process according to claim 1.

8. A cellulose ester of lower fatty acids prepared by the process according to claim 2.

9. A cellulose ester of lower fatty acids prepared by the process according to claim 3.

10. A cellulose ester of lower fatty acids prepared by the process according to claim 4.

11. A cellulose ester of lower fatty acids prepared by the process according to claim 5.

12. A cellulose ester of lower fatty acids prepared by the process according to claim 6.

In testimony whereof, we affix our signatures.

MAX HAGEDORN.
OTTO REICHERT.